United States Patent
Kuhn (10) Patent No.: US 8,542,588 B2
(45) Date of Patent: Sep. 24, 2013

(54) INVOKING DIFFERENT WIRELESS LINK RATE SELECTION OPERATIONS FOR DIFFERENT TRAFFIC CLASSES

(75) Inventor: Steven J. Kuhn, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1378 days.

(21) Appl. No.: 12/146,141

(22) Filed: Jun. 25, 2008

(65) Prior Publication Data

US 2009/0323524 A1 Dec. 31, 2009

(51) Int. Cl.
*G01R 31/08* (2006.01)
*H04B 7/00* (2006.01)

(52) U.S. Cl.
USPC .......... 370/230.1; 370/310; 370/395.21; 370/395.42

(58) Field of Classification Search
None
See application file for complete search history.

(56) References Cited

U.S. PATENT DOCUMENTS

| | | | |
|---|---|---|---|
| 6,459,682 B1 | 10/2002 | Ellesson et al. | |
| 6,493,317 B1 * | 12/2002 | Ma | 370/237 |
| 6,591,299 B2 | 7/2003 | Riddle et al. | |
| 6,904,020 B1 | 6/2005 | Love et al. | |
| 7,043,659 B1 | 5/2006 | Klein | |
| 7,493,407 B2 | 2/2009 | Leedom et al. | |
| 7,664,048 B1 | 2/2010 | Yung et al. | |
| 7,782,786 B1 | 8/2010 | Natarajan et al. | |
| 7,957,291 B2 * | 6/2011 | Boch et al. | 370/235.1 |
| 8,004,973 B2 | 8/2011 | Budhani et al. | |
| 8,131,852 B1 | 3/2012 | Miller et al. | |
| 2002/0122387 A1 * | 9/2002 | Ni | 370/231 |
| 2003/0229720 A1 | 12/2003 | Kiremidjian et al. | |
| 2005/0052997 A1 * | 3/2005 | Montes Linares | 370/230 |
| 2005/0114541 A1 | 5/2005 | Ghetie et al. | |
| 2005/0185582 A1 | 8/2005 | Wybenga et al. | |
| 2006/0048142 A1 | 3/2006 | Roese et al. | |
| 2006/0251234 A1 | 11/2006 | Cooke | |
| 2007/0061433 A1 | 3/2007 | Reynolds et al. | |
| 2007/0143377 A1 | 6/2007 | Waites | |

(Continued)

FOREIGN PATENT DOCUMENTS

| | | |
|---|---|---|
| CN | 101977146 A | 2/2011 |
| EP | 1750394 A2 | 2/2007 |

(Continued)

OTHER PUBLICATIONS

U.S. Appl. No. 11/969,829, filed Jan. 4, 2008, Cho, James et al.

(Continued)

*Primary Examiner* — Yemane Mesfin
*Assistant Examiner* — Christine Duong
(74) *Attorney, Agent, or Firm* — DeLizio Gilliam, PLLC (57) ABSTRACT

A device or chip can be designed and/or programmed to select different sets of wireless link rate determination operations that account for different degrees of presentation time sensitivity that correspond to different classes of traffic. The device or chip can infer or explicitly determine presentation time sensitivity based, at least in part, on traffic class. The selected wireless link rate operations select link rates for the different classes of traffic. A first set of the wireless link rate determination operations can choose a smoother and more stable wireless link rate for the wireless traffic class that conveys presentation time sensitive content. A second of the wireless link rate determination operations can choose a fastest possible wireless link rate, which may be more susceptible to jitter and delay, for a traffic class that is less sensitive.

18 Claims, 6 Drawing Sheets

(56) References Cited

U.S. PATENT DOCUMENTS

| | | |
|---|---|---|
| 2007/0180119 A1 | 8/2007 | Khivesara et al. |
| 2008/0147735 A1 | 6/2008 | Sloo |
| 2008/0267203 A1* | 10/2008 | Curcio et al. ............. 370/412 |
| 2008/0273533 A1* | 11/2008 | Deshpande ............. 370/392 |
| 2009/0059937 A1 | 3/2009 | Kanada |
| 2009/0083326 A1 | 3/2009 | Pelton |
| 2009/0180430 A1 | 7/2009 | Fadell |
| 2009/0228462 A1 | 9/2009 | Frieder et al. |
| 2009/0252219 A1* | 10/2009 | Chen et al. ............. 375/240.02 |
| 2009/0300196 A1 | 12/2009 | Haghpassand |
| 2009/0303908 A1* | 12/2009 | Deb et al. ............. 370/310 |
| 2010/0023604 A1 | 1/2010 | Verma et al. |
| 2010/0208614 A1* | 8/2010 | Harmatos ............. 370/253 |
| 2010/0260048 A1 | 10/2010 | Dolganow et al. |
| 2010/0322255 A1 | 12/2010 | Hao et al. |
| 2011/0106786 A1 | 5/2011 | Waters et al. |
| 2011/0122810 A1 | 5/2011 | Hodroj et al. |
| 2011/0282975 A1 | 11/2011 | Carter |
| 2011/0289440 A1 | 11/2011 | Carter et al. |
| 2012/0042216 A1 | 2/2012 | Blubaugh |
| 2013/0100803 A1 | 4/2013 | Menchaca et al. |
| 2013/0100955 A1 | 4/2013 | Dunlap et al. |
| 2013/0103660 A1 | 4/2013 | Welsh et al. |
| 2013/0103827 A1 | 4/2013 | Dunlap et al. |

FOREIGN PATENT DOCUMENTS

| | | |
|---|---|---|
| EP | 1990960 | 11/2008 |
| EP | 2273737 | 12/2011 |
| JP | 2008085536 | 4/2008 |
| TW | 201322694 | 6/2013 |
| WO | 2006068548 A1 | 6/2006 |
| WO | 2007061433 | 3/2007 |
| WO | 2007142567 A1 | 12/2007 |
| WO | 2010074619 A1 | 7/2010 |
| WO | 2013059742 A1 | 4/2013 |
| WO | 2013059744 A1 | 4/2013 |
| WO | 2013059760 A1 | 4/2013 |
| WO | 2013063142 A2 | 5/2013 |

OTHER PUBLICATIONS

U.S. Appl. No. 11/197,773, filed Aug. 3, 2005, Cho, James et al.
Bicket, John C., "Bit-rate Selection in Wireless Networks", *Massachusetts Institute of Technology*, http://dspace.mit.edu/handle/1721.1/34116,(Feb. 2005).
Thottan, Marina et al., "Impact of 802.11e EDCA on Mixed TCP-based Applications", In *Proceedings of the 2nd annual international workshop on Wireless internet, ACM International Conference Proceeding Series*, vol. 220, http://portal.acm.org/citation.cfm?id=1234161.1234187,(Aug. 2-5, 2006).
"Preparing the WLAN for Voice", *Avaya Inc.*, www.avaya.com/master-usa/en-us/resource/assets/whitepapers/ef-lb2731.pdf,(May 2005).
"PCT Application No. PCT/US2012/061214 International Search Report", Jan. 8, 2013 , 9 pages.
"PCT Application No. PCT/US2012/061236 International Search Report", Jan. 23, 2013 , 13 pages.
Co-pending U.S. Appl. No. 13/656,602, filed on Oct. 19, 2012.
Co-pending U.S. Appl. No. 13/655,602, filed Oct. 19, 2012, pp. 40.
Co-pending U.S. Appl. No. 13/659,579, filed Oct. 24, 2012, pp. 53.
Co-pending U.S. Appl. No. 13/737,387, filed Jan. 9, 2013, pp. 37.
Co-pending U.S. Appl. No. 61/550,335, filed Oct. 21, 2011, pp. 18.
Co-pending U.S. Appl. No. 61/550,339, filed Oct. 21, 2011, pp. 18.
Co-pending U.S. Appl. No. 61/550,344, filed Oct. 21, 2011, pp. 21.
Co-pending U.S. Appl. No. 61/550814, filed Oct. 24, 2011, pp. 34.
Co-pending U.S. Appl. No. 61/584,628, filed Oct. 19, 2012, pp. 16.
Fgee, E.B., et al., "Implementing an IPv6 QoS management scheme using flow label & class of service fields", Electrical and Computer Engineering, 2004. Canadian Conference on Niagara Falls, Ont., Canada May 2-5, 2004, Piscataway, NJ, USA, IEEE, US, May 2, 2004, p. 1049, XP010734004, DOI: 10.1109/CCECE.2004.1345298 ISBN: 978-0-7803-8253-4 see sections 2.2 and 3.1.
Giroux, N., et al., "Quality of Service in ATM networks; state-of-the-art traffic management. Chapter 2", 1998, Prentice Hall PTR, XP002691732, ISBN: 0-13-095387-3 pp. 10-32, ATM traffic contract. Detailed quality of service definition.
Tong, et al., et al., "Bandwidth Management for Supporting Differentiated Service Aware Traffic Engineering", IEEE Transactions on Parallel and Distribiuted Systems, IEEE Service Center, Los Alamitos, CA, US, vol. 18, No. 9, Sep. 1, 2007, pp. 1320-1331, XP011190143, ISSN: 1045-9219, DOI: 10.1109/TPDS.2007.1052.
Suzuki, K., et al., "Home network with cloud computing for Home Management", Consumer Electronics (ISCE), 2011 IEEE 15th International Symposium on, IEEE, Jun. 14, 2011, pp. 421-425, XP032007891, DOI: 10.1109/ISCE.2011.5973862 ISBN: 978-1-61284-843-3 the whole document.
"PCT Application No. PCT/US2012/061725 International Search Report and Written Opinion", Apr. 26, 2013 , 18 pages.
"PCT Application No. PCT/US2012/061216 International Search Report", Mar. 21, 2013 , 18 pages.
"PCT Application No. PCT/US2013/020863 International Search Report", Mar. 15, 2013 , 13 pages.

* cited by examiner

INVOKING DIFFERENT WIRELESS LINK RATE SELECTION OPERATIONS FOR DIFFERENT TRAFFIC CLASSES

BACKGROUND

Embodiments of the inventive subject matter generally relate to the field of wireless networks, and, more particularly, selecting different wireless link rate selection algorithms for different classes of traffic.

The 802.11e amendment to the 802.11 standard defines quality of service (QoS) enhancements for wireless LAN applications to accommodate different priorities for traffic. Wi-Fi Multimedia (WMM), which is based on 802.11e, prioritizes wireless traffic into four media access control categories-voice, video, best effort and background. The voice and video traffic categories are the highest priority traffic categories, while the best effort and background traffic categories are lower priority traffic categories. The voice and video traffic categories have higher priorities because voice and video traffic are more sensitive to channel quality. Best effort traffic (e.g., data traffic for web browsing) is less sensitive to channel quality. The background traffic category has the lowest priority because background traffic (e.g., data traffic for file downloads and print jobs) is the least sensitive to channel quality. This traffic prioritization scheme generally allows voice and video data to be transmitted before best effort and background data.

A transmitting station applies a link rate selection algorithm to the channel shared by the different categories of traffic. The link rate selection algorithm aggressively seeks the fastest possible link rate, which can lead to bursty transmissions.

SUMMARY

Embodiments include a method that determines that a wireless channel will carry a first class of traffic and a second class of traffic. Presentation of content conveyed by the first class of traffic and presentation of content conveyed by the second class of traffic have different degrees of presentation time sensitivity. Different wireless link rate determination operations are instantiated for the first class of traffic and the second class of traffic. The instantiated different wireless link rate determination operations determine wireless link rates for wireless transmission of data units of the first and second classes of traffic. The different wireless link rate determination operations correspond to the different degrees of presentation time sensitivity.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to traffic sharing a channel, embodiments can also aggregate multiple channels for sharing by traffic. In other instances, well-known instruction sequences[?], protocols, structures and techniques have not been shown in detail in order not to obfuscate the description.

Aggressively selecting faster wireless link rates can lead to increased jitter and delay. Jitter and delay noticeably and significantly affect presentation of wireless traffic content (e.g., content from video and voice traffic). The wireless traffic content is subject to presentation time expectations of the applications and/or processes that consume the wireless traffic. Although some applications/processes can tolerate a degree of jitter and delay, their tolerance may have limits. In addition, the end user experience may not tolerate, or have very low tolerance, for the effects of jitter and delay. If some content is not available due to jitter and/or delay, then content presentation/utilization can be incomplete, corrupted, etc. Functionality can be implemented within a device or chip to select different wireless link rate determination operations that account for different degrees of presentation time sensitivity that correspond to different classes of traffic. The device or chip can infer or explicitly determine presentation time sensitivity based, at least in part, on traffic class. The selected wireless link rate operations select link rates for the different classes of traffic. A first set of the wireless link rate determination operations can choose a smoother and more stable wireless link rate for the wireless traffic class that conveys presentation time sensitive content. A second set of the wireless link rate determination operations can choose a fastest possible wireless link rate, which may be more susceptible to jitter and delay, for a traffic class that is less sensitive.

Figure 1:
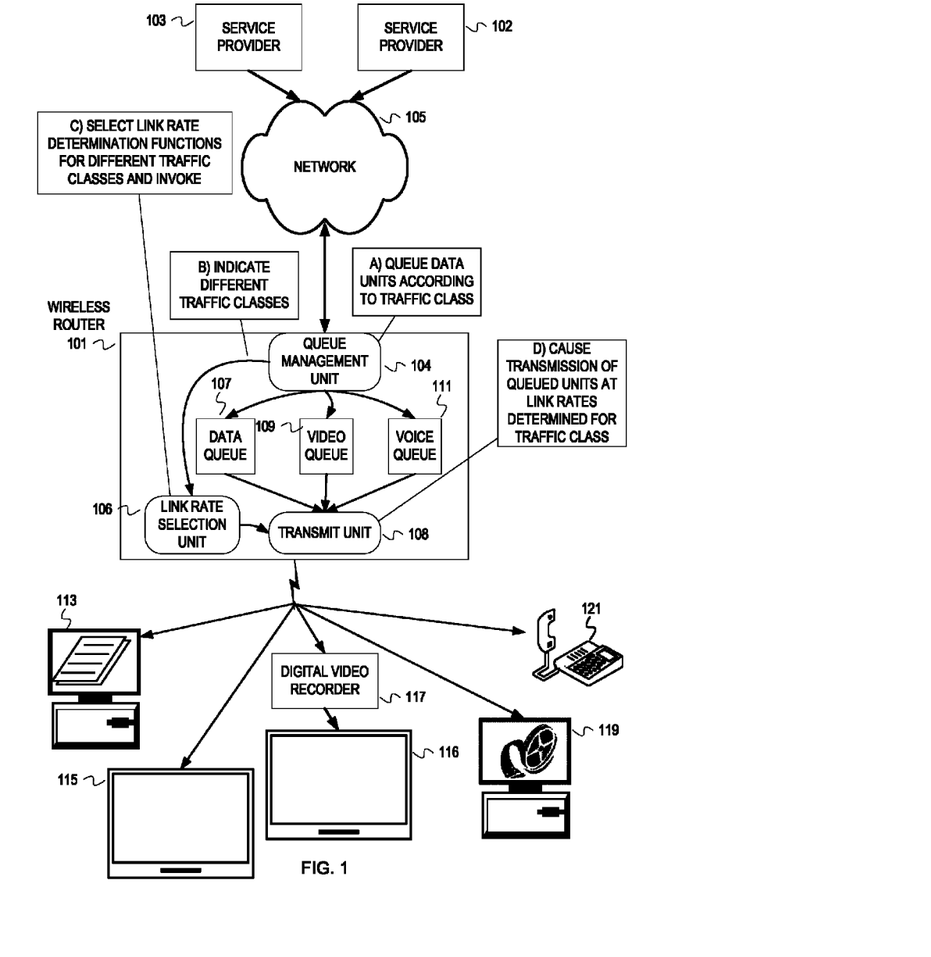
FIG. 1 depicts a conceptual example of selecting different wireless link rate determination functions for different classes of traffic in a wireless network.

FIG. 1 depicts a conceptual example of selecting different wireless link rate determination functions for different classes of traffic in a wireless network. The wireless network depicted in FIG. 1 includes a wireless router 101 associated with computers 113, 119, a telephone 121, a television 115 and a digital video recorder 117 that provides video content to a television 116. The wireless router 101 is connected to a network 105. Service providers 103 and 102 provide video, voice, and other content (e.g., text and images from browsing the Internet) to the wireless router 101 via the network 105. Presentations of the content provided by the service providers have different degrees of presentation time sensitivity. For instance, the voice and video content can be considered as having a higher degree of presentation time sensitivity than text and images delivered in response to Internet browsing. The data traffic that conveys the different content is perceived as different classes that correspond to the degrees of presentation time sensitivity, which can range from no sensitivity to a very high degree of sensitivity.

The wireless router 101 comprises a data queue 107, a video queue 109 and a voice queue 111 for data units (e.g., packets, frames, etc.) that carry the content from the service providers 102 and 103. The wireless router 101 also comprises a queue management unit 104, a link rate selection unit 106, and a transmit unit 108. The queue management unit 104 enqueues data units received from the network 105 in accordance with the corresponding traffic class. The queue management unit 104 enqueues data units of the video traffic class into the video queue 109 and data units of the voice traffic class into the voice queue 111. The queue management unit 104 enqueues data units of another traffic class(es) into the data queue 107. The queue management unit 104 can determine traffic class in accordance with a variety of techniques. The queue management unit 104 can determine traffic class based on examining headers of the data units, examining payload of the data unit, connection information (e.g., source address), etc. In addition, data units and/or connection information can implicitly or explicitly indicate traffic class. For example, the queue management unit 104 can rely on information provided in accordance with WMM for 802.11e, which defines four categories of traffic: voice, video, best effort and background. The traffic categories are prioritized in the order given. In the depicted example, the data queue 107 handles data units of the best effort and background categories. In some embodiments, separate queues can be instantiated for best effort and background traffic categories to maintain WMM priorities. In other embodiments, the data queue 107 can comprise a single queue that maintains WMM priorities with a sorting, a ranking, etc. The video queue 109 handles data units for the video traffic category. Examples of video traffic include streaming high-definition video, streaming standard-definition video, etc. All traffic that conveys video traffic is not necessarily categorized in the video category of traffic. For instance, data units for video files to be downloaded for later viewing could be categorized in the background category and handled by the data queue 107. The voice queue 111 handles data units of the voice category of traffic. Examples of voice traffic include VoIP, internet messaging voice chat, etc.

At a stage A, the queue management unit 104 queues data units according to their traffic class. At a stage B, the queue management unit 104 indicates the different traffic classes to the link rate selection unit 106 (e.g., flags are set in a shared memory location(s), a message is sent, etc.). In some embodiments, the link rate selection unit 106 can periodically or responsively examine the queues 107, 109, and 111 to determine the traffic classes of the data units to be transmitted.

At a stage C, the link rate selection unit 106 determines link rate determination functions for the different traffic classes represented by the data units in the queues 107, 109, and 111. Embodiment can also be aware of the traffic classes that will traverse the wireless router 101 (e.g., based on historical data, based on configurations, based on initial setup of connections, etc.) and select link rate determination functions in advance of receiving data units. The link rate selection unit 107 invokes the selected link rate determination functions (e.g., instantiates processes, threads, or daemons). The invoked link rate determination functions select link rates for the different classes of traffic. For example, a first invoked link rate determination function may aggressively probe for a maximum link rate to transmit data units in the data queue 107. The link rate may be increased after 5 successful data unit transmissions at the current rate. The first invoked link rate determination function may then decrease the wireless link rate for the data units in the data queue 107 after 10 unsuccessful data unit transmissions.

The link rate selection unit 106 may select and invoke different link rate determination functions for video and voice traffic. With respect to the video traffic, the video content to be presented can be 20 megabits in size so a fast link rate is desirable. However, video has a higher degree of presentation time sensitivity. Dropped data units or resending data units beyond their presentation time can noticeably reduce the quality of the video presentation. A second invoked less aggressive link rate determination function can periodically probe for faster link rates to transmit video data units from the video queue 109 while maintaining a relatively moderate wireless link rate. For instance, the second invoked less aggressive link rate function can maintain link rates that fall within thresholds that represent jitter and/or delay thresholds. The thresholds can be predefined and/or determined dynamically based, at least in part, on channel quality. For instance, a maximum threshold range of dropped and/or resent data units and a minimum threshold range of throughput can be configured. The implementing wireless access device can determine actual thresholds within the configured ranges based on channel quality. With respect to the voice traffic, voice traffic is slightly different than video traffic in that the traffic tends to be two-way and the data units smaller. For instance, a voice data unit may be 64 kilobits in size or less. Hence, the second invoked less aggressive link rate determination function or a third invoked link rate determination function, which is also less aggressive than the first, may be determined for the voice traffic. A third invoked link rate determination function can conservatively probe for faster wireless link rates to prevent the voice queue 111 from becoming overwhelmed as voice traffic increases. As with the second invoked wireless link rate determination function, the third invoked wireless link rate determination function can determine wireless link rates for the voice traffic within maximum and minimum thresholds to determine appropriate link rates for the voice traffic. Although conservatively probing for faster wireless link rates, the third invoked link rate determination function may decrease the wireless link rate quickly in response to transmission failures. For example, the third invoked link rate determination function may increase the wireless link rate for voice traffic after 10 successful data unit transmissions at a current rate and decrease the wireless link rate after 5 unsuccessful data unit transmissions. Embodiments can also spawn the link rate determination functions as processes or threads that communicate with the transmit unit, that indicate the wireless link rates in a memory location(s) accessed periodically by the transmit unit, etc. In addition, embodiments can communicate references to the selected link rate determination functions to the transmit unit 108. The transmit unit 108 can then invoke the selected link rate determination functions.

At stage D, a transmission unit 108 causes transmission of the queued data units in accordance with the selected wireless link rates. Accordingly, the wireless router 101 transmits the queued data units to connected wireless devices at the link rate associated with each queue's traffic class. The computer 113 is downloading a file from the Internet. Since file downloads fall into the background category and lower presentation time sensitivity traffic class, data units to be transmitted to computer 113 will pass through the data queue 107. The television 115, digital video recorder 117 and computer 119 are consuming streaming video feeds. Data units for the television 115, digital video recorder 117 and computer 119 pass through the video queue 109. Data units for telephone 121 pass through the voice queue 111.

FIG. 1 depicts this conceptual example with the use of stages to approximately indicate timing of operations. The indications of stages in any of the examples, however, is merely to aid in understanding the examples and not intended to be limiting upon embodiments. For instance, all stages depicted in FIG. 1 may overlap. As another example, stages B and C may occur once or occasionally while stages A and D are ongoing.

The description for the example depicted by FIG. 1 refers to selection and invocation of link rate determination functions as a convenient expression for invoking code that implements different algorithms and/or criteria for selecting wireless link rates. Embodiments should not be limited by the use of the term function. Embodiments can invoke functionality implemented as a single function (or procedure or method depending on the implementing programming language) that determines link rates based on traffic classes. Moreover, the functionality for selecting link rates can range from substantially different operations for the different traffic classes to a same set of operations that operate with different parameters based on the different traffic classes.

Although the example depicted in FIG. 1 roughly correlates presentation time sensitive traffic class to the WMM traffic categories, the correlation is not necessary. Embodiments can aggregate video and voice traffic into a single high degree of presentation time sensitivity traffic class. Embodiments can also classify video and voice as one or more traffic classes with a lower degree(s) of presentation time sensitivity than other data. As an example, a wireless access device may be transmitting real time ambient temperature data for an experiment that requires smooth real-time delivery of the ambient temperature data. The wireless access device may also be transmitting streaming video that does not have the stringent presentation time requirement of the ambient temperature data. The wireless access device classifies the ambient temperature data as a higher presentation time sensitive traffic class and the stream video traffic as a lower presentation time traffic class. The wireless access device can then select a smoother, more reliable wireless link rate for the ambient temperature data.

The example wireless network configuration depicted in FIG. 1 should also not be used to limit embodiments or scope of the claims. It is not necessary for traffic to be delivered from an external network or from service providers. For example, a wireless access device or chip can select a first wireless link rate determination function to determine a wireless link rate for traffic traveling from video recorder to a wireless television and select a second wireless link rate determination function to determine link rate for data units traveling from a microphone to wireless headphones. Moreover, embodiments can implement different configuration with respect to the wireless access device. The functionality of the link rate selection unit 106 and the transmit unit 108 can be implemented as a single logical unit, separate hardware units, etc. For instance, the link rate selection unit 106 and the transmit unit 108 can be implemented on different cores within a multi-core processor. In addition, link rate selection processes can be instantiated on different cores. Variations in embodiments will result in variations in operations to implement traffic class based selection of link rate determination functions or mechanisms.

Figure 2:
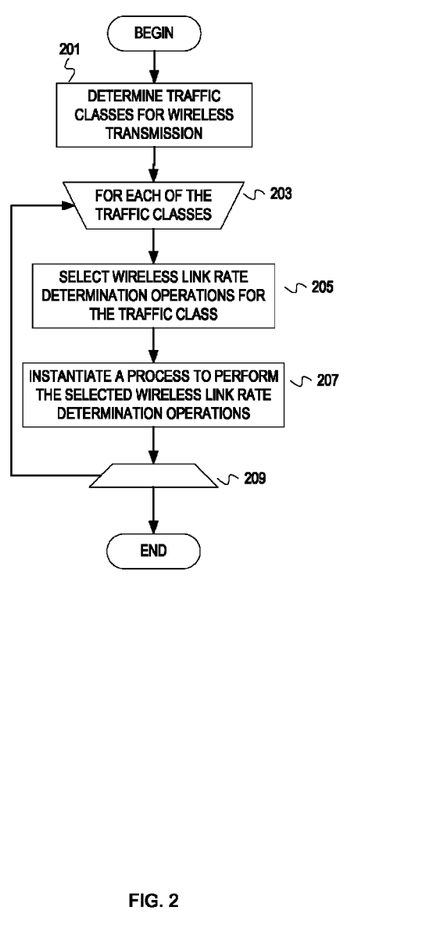
FIG. 2 depicts a flow chart of example operations for determining wireless link rate selection operations based on traffic class.

FIG. 2 depicts a flow chart of example operations for determining wireless link rate selection operations based on traffic class. At block 201, traffic classes are determined for wireless transmission. For example, a message is received that indicates traffic class of data units residing in queues. As another example, queued data units are inspected to determine corresponding traffic class. A consuming device can also communicate traffic class to a wireless access device that transmits data units to the consuming device. For instance, a media center can indicate to the wireless access device (e.g., a router, gateway, cell phone, etc.) that all traffic transmitted to the media center should be classified as highly presentation time sensitive traffic, perhaps when establishing the connection between the wireless access point and the media center.

At block 203, a loop begins for each determined traffic class.

At block 205, a set of wireless link rate determination operations are selected for the traffic class. For example, a call is made to a particular function with an indication of the traffic class passed as a parameter. As another example, an address to a sequence of instructions is selected based on an indication of the traffic class, and the address is passed to one or more execution units.

At block 207, a process is instantiated to perform the selected wireless link rate determination operations.

In some cases, a wireless access device or wireless communication chip may experience high levels of traffic and/or degradation in channel quality. During these situations, video and voice data units may be delayed so that they are not transmitted before a consuming device will present the content of the data units. To avoid penalizing other data units that have yet to be transmitted, functionality can be implemented in a wireless access device or wireless communication chip to avoid transmitting packets that will not be received before their presentation time.

Figure 3:
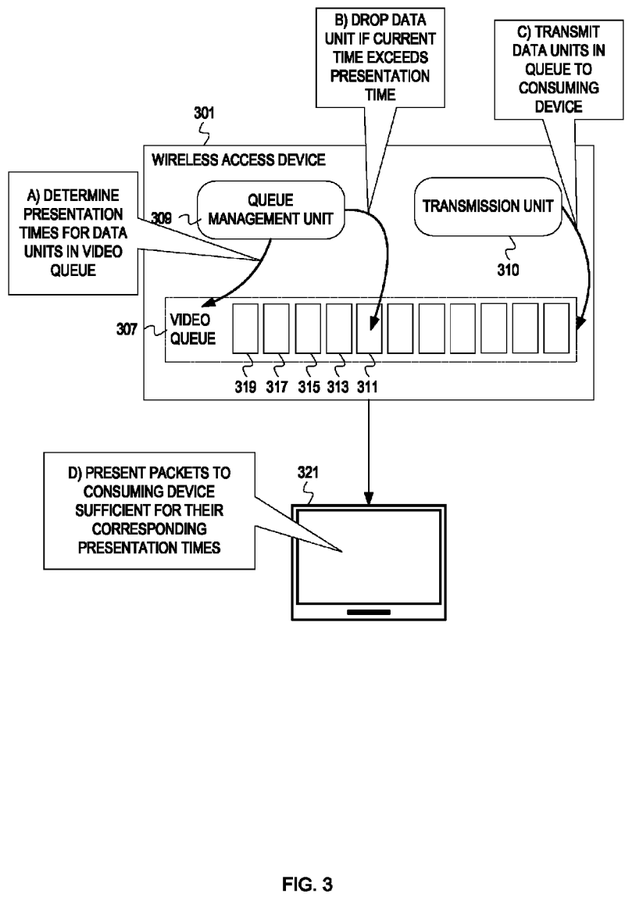
FIG. 3 depicts a conceptual example of a wireless access device managing a queue in accordance with presentation times.

FIG. 3 depicts a conceptual example of a wireless access device managing a queue in accordance with presentation times. A wireless access device 301 is wirelessly connected to a video presentation device 321. The wireless access device 301 comprises a queue management unit 309, a transmission unit 310 and a video queue 307 which hosts video data units 311, 313, 315, 317, and 319. Note that techniques used to manage data units in a video queue may also be used to manage data units in other traffic class queues, such as a voice queue.

At stage A, the queue management unit 309 determines presentation times for data units in the video queue 307. A video data unit's presentation time is the time that the content of a data unit will be displayed by the video presentation device 321. The queue management unit 309 can determine presentation times for data units from the data units and/or communications from the video presentation device 321. At stage B, the queue management unit 309 discards the data unit 311 because the current time exceeds the presentation time for the data unit 311. For example, the video data unit 311 may be scheduled to be presented 30 milliseconds after the video has been started on the video display device 321. If the data unit 311 is not received by the video display device 321 before 30 milliseconds have elapsed, the data unit 311 cannot be displayed. If the data unit is received after 30 milliseconds, the video display device 321 will discard the data unit 311. However, the video display device 321 may be able to continue displaying the video without the data unit 311 without significant or noticeable degradation if the other data units are received on time. Accordingly, the queue management unit 309 can determine that the data unit 311 will not be transmitted in sufficient time for presentation. The queue management unit 311 drops the data unit 311 and avoids penalizing data units 313, 315, 317, and 319 that were behind data unit 311 in the queue 307. Preemptively dropping data unit 311 when the presentation time has been passed increases efficiency in the wireless access device and helps future data units to be transmitted before expiration of their presentation times, perhaps allowing the video display device to gracefully recover from the loss of the data unit 311.

At stage C, the transmission unit 310 transmits data units in the video queue to television 321. At stage D, the television 321 presents data units to the end user at their corresponding presentation times.

In addition to managing queues based on presentation times, a wireless access device or wireless communication chip can monitor queue lengths to minimize the impact of jitter and/or delay on particular traffic classes. For instance, timely transmission and receipt of voice and video data units affect voice and video quality. Typically, users are more tolerant of decreased voice quality compared to decreased video quality. Users have become accustomed to choppiness in voice because of mobile phone experiences. It is not uncommon to experience breaks in voice continuity while using a mobile phone, while still being able to understand the content of the call. In addition, voice codecs can tolerate more dropped data units than video codecs. For end users, it is more difficult to interpret the content of a video when data units are missing. Therefore, more concessions may be made to video traffic to maintain quality of service.

Figure 4:
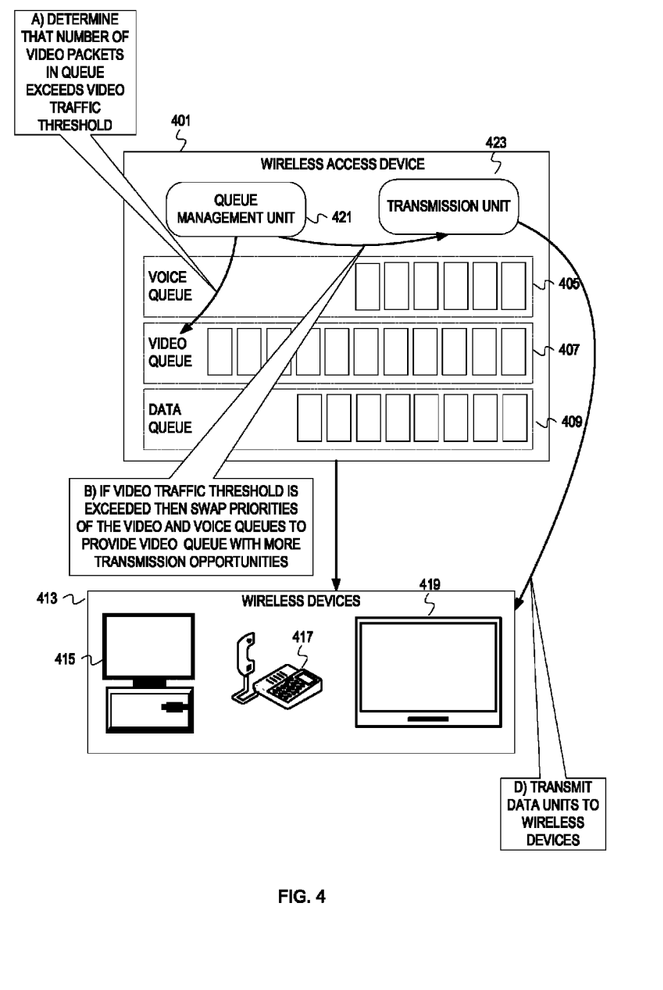
FIG. 4 is a conceptual diagram depicting an example of a wireless access device addressing quality of service for video traffic.

FIG. 4 is a conceptual diagram depicting an example of a wireless access device addressing quality of service for video traffic. For this illustration, it is assumed that the voice queue has a higher priority than the video queue and is given more transmission opportunities than the video queue. This assumption is consistent with, by way of example and not limitation, the priority classes of the IEEE-802.11e standard, but is made herein for illustrative purposes, and does not limit embodiments prioritizing video above voice, data above video, etc. This assumption also does not limit embodiments from disassociating transmission opportunities from specified priority, considering alternative or additional factors in assigning transmission opportunities, etc. In addition, the use of the term transmission opportunity and transmission opportunities should not be limited to TXOP (a bounded time interval for a device to transmit as many data units as possible) as defined in 802.11, but TXOP is an example of a parameter that can be adjusted to adjust transmission opportunity. In FIG. 1, a wireless access device 401 comprises a queue management unit 421, a transmission unit 423, a voice queue 405, a video queue 407, and a data queue 409. The wireless access device 401 is wirelessly connected to wireless devices 413 which include a computer 415, telephone 417 and television 419. At stage A, the queue management unit 421 determines that the number of video data units in the video queue 407 exceeds a video traffic threshold. The video traffic threshold may be indicated by a network administrator, determined by the maximum throughput at the current link rate, etc.

At stage B, the queue management unit 421, if the video queue 407 exceeds the video traffic threshold, swaps priorities of the video queue 407 and the voice queue 405. The queue management unit 421 swaps the priorities of the video queue 407 and the voice queue 405 to provide the video queue with more transmission opportunities. For example, the queue management unit 421 changes pointers to priority indications for the queues or writes different priority indications in a data structure accessed by the transmission unit 423. The queue management unit 421 can swap priorities until a queue condition is satisfied, until a traffic condition is detected, for a given time period, until reset by an administrator, etc. In addition, another granularity of priority can be considered, such as priority among the video data. Video data units may correspond to different video traffic of different priorities. An example of associating different priorities to different types of video traffic includes associating one or more of pay per view video (PPV), video accessed by a membership fee, and high definition video with a higher priority than one or more of streaming video from a website (e.g., YouTube®) and standard definition video. Embodiments may not necessarily associate the different priorities of video traffic with the voice queue priority. For instance, the queue management unit 421 and the transmission unit 423 can treat traffic for a high definition PPV video as highest priority, voice traffic as second priority, and video traffic from a free website as third priority.

At stage C, the transmission unit 423 transmits data units in the voice queue 405, video queue 407 and data queue 409 to wireless devices 413 in accordance with priorities indicated for the queues.

Although FIG. 4 depicts swapping priorities of queues to give video traffic more transmission opportunities, embodiments are not so limited. Embodiments can dynamically generate and apply a different set of priorities to the different types of traffic being received by a wireless device based on various parameters (e.g., time of day, traffic content, membership fees, transmission policies, etc.). Embodiments can utilize predefined situational priorities. In addition, embodiments can move groups or individual video data units from the video queue 407 into the voice queue 405 to implicitly swap priorities of the queues. Furthermore, the wireless link rate determination processes for different traffic classes can be aware of transmission information for the other traffic classes (e.g., queues lengths, actual throughput, number of retries, etc.). The different wireless link rate determination processes adjust thresholds and/or transmission variables (e.g., contention window, contention free period, backoff time, a bounded time interval for a device to transmit as many data units as possible, etc.) to accommodate another traffic class. For example, a wireless link rate determination process associated with a data queue and a wireless link rate determination process associated with a video queue can communicate to accommodate the video traffic when the video traffic exceeds a threshold portion of total traffic traversing a wireless access device. The processes can adjust transmission variables to provide the video traffic more transmission opportunities.

In some cases, a wireless access device may experience high levels of traffic and/or decreased channel quality due to a moving station, interference, etc. The wireless access device or wireless communication chip can give more presentation time sensitive traffic bandwidth from less presentation time sensitive traffic, and reduce the effect of the less presentation time sensitive traffic on the more presentation time sensitive traffic. When the more presentation time sensitive traffic exceeds a threshold, then the wireless link rate determination processes can negotiate (or follow a given policy) to give the more presentation time sensitive traffic more transmission opportunities.

Figure 5:
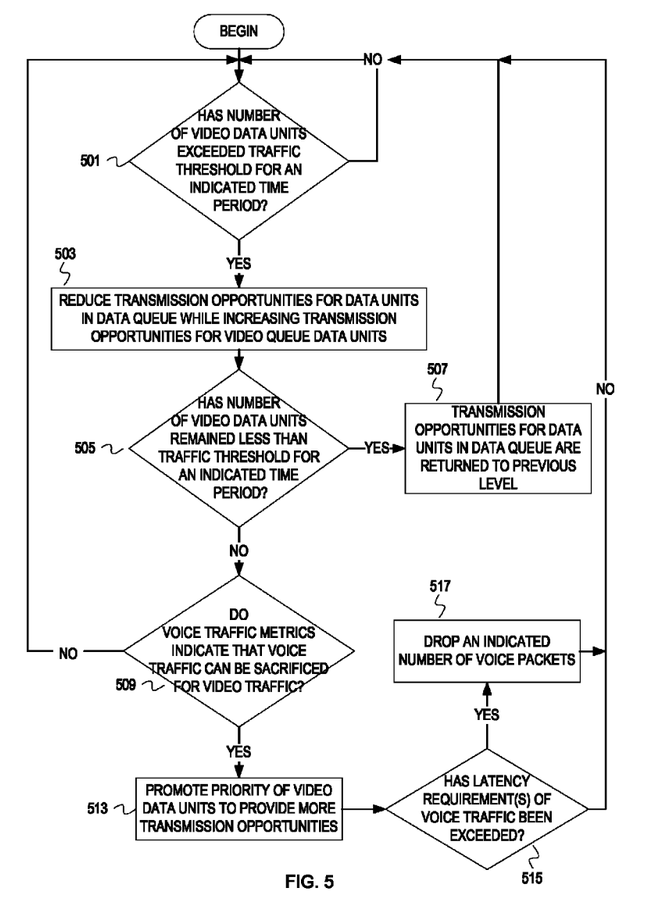
FIG. 5 is a flowchart depicting example operations for maintaining quality of service for video traffic with priority inversion.

FIG. 5 is a flowchart depicting example operations for maintaining quality of service for video traffic with priority inversion. Flow begins at block 501, where it is determined if the number of video data units has exceeded a video traffic threshold for an indicated period of time. For instance, a process or thread that enqueues data units determine current queue length when enqueueing data units. The video traffic threshold is a number of data units that indicates the video queue is beginning to fill up. The video traffic threshold and period of time may be determined by maximum throughput at the current rate, indicated by a network administrator, etc. For example, a video traffic threshold may be set to 75 percent of the available space for data units in a video queue. The time period is used to determine if the high level of video traffic is persisting or is an isolated event. Quality of service may only be addressed if a high level of traffic is persisting. If the number of video data units has exceeded the video traffic threshold for the indicated period of time, flow continues at block 503. If the number of video data units has not exceeded the video traffic threshold for the indicated period of time, flow returns to block 501.

At block 503, transmission opportunities for data units the data queue are reduced while transmission opportunities for data units in the video queue are increased. Examples of reducing transmission opportunities for data units in the data queue include increasing the contention window for the data queue, increasing the data unit retry time after failure, decreasing the number of data unit retries, etc. Since traffic in the data queue is less sensitive to delay, reducing transmission opportunities does not significantly affect quality of service for data traffic.

At block 505, it is determined if the number of video data units has remained less than the traffic threshold for an indicated period of time. In some embodiments, the period of time may be the same as the period of time discussed in reference to block 501. In other embodiments, the period of time may be different. If the number of video data units has remained less than the traffic threshold for an indicated period of time, flow continues at block 507. If the number of video data units has not remained less than the traffic threshold for an indicated period of time, flow continues at block 509.

At block 507, transmission opportunities for data units in the data queue are returned to normal previous level. In addition, transmission opportunities for data units in the video queue may be returned to previous levels. For example, probing may be suppressed until the video traffic throughput is acceptable. After the video queue falls below the threshold, then aggressive probing can resume for the data queue data units. As another example, contention window and retry values are restored to default or previous values. Flow returns to block 501.

At block 509, it is determined if the voice traffic transmission metrics indicate voice traffic is to be sacrificed for video traffic. For example, transmission opportunities may be taken from voice traffic if the voice traffic has very low actual throughput and high transmission time and retry metrics. If the voice traffic metrics indicate that voice traffic may not be sacrificed, flow returns to block 501. If the voice traffic metrics indicate that voice traffic may be sacrificed, then flow continues at block 513.

At block 513, priority of the video data units is promoted to provide more transmission opportunities to the video data units. For example, explicit priority indications for the video and voice queues are changed. In another example, references to the queues are swapped to cause the transmission unit to process video data units as if from the voice queue. Embodiments can also move data units among the queues, such as moving video data units to the voice queue. The indicated number of video data units to be moved may be a constant number, a number based on how many total data units are in the queue, the number of high priority data units in the queue, etc. Flow continues to block 515.

At block 515, the latency requirements of the voice traffic are examined. If the latency requirements have not been exceeded, flow returns to block 501. If, on the other hand, latency requirements have been exceeded, flow continues at block 517.

At block 517, an indicated number of voice data units are dropped. The number of voice data units to be dropped may be determined by a percentage of voice data units in the voice queue, a number based on the fullness of the voice queue, etc. Flow returns to block 501 from block 517.

It should be understood that the depicted flowcharts are examples meant to aid in understanding embodiments and should not be used to limit embodiments or limit scope of the claims. Embodiments may perform additional operations, fewer operations, operations in a different order, operations in parallel, and some operations differently. For instance, operations in FIG. 2 are not necessarily performed in a loop. Operations for selecting and instantiating wireless link rate determination operation can be performed individually for each traffic class. In addition, operations may already be instantiated as a process or thread. Different flags or values can be passed into the already instantiated set of operations for different traffic classes. The already instantiated operations then determine wireless link rates based on traffic class as represented by the corresponding flag or value. Referring to FIG. 5, operations represented by block 513 may not be performed. If the voice traffic metrics do not indicate that the voice traffic can be sacrificed, then perhaps the video traffic is limited to taking bandwidth from other types of traffic. As another example of variation, additional operations may be performed to take bandwidth from other types of traffic only for one of three different priorities of video traffic. Indeed, a wireless channel may carry different classes of traffic that completely comprise video content instead of voice, video, and data.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
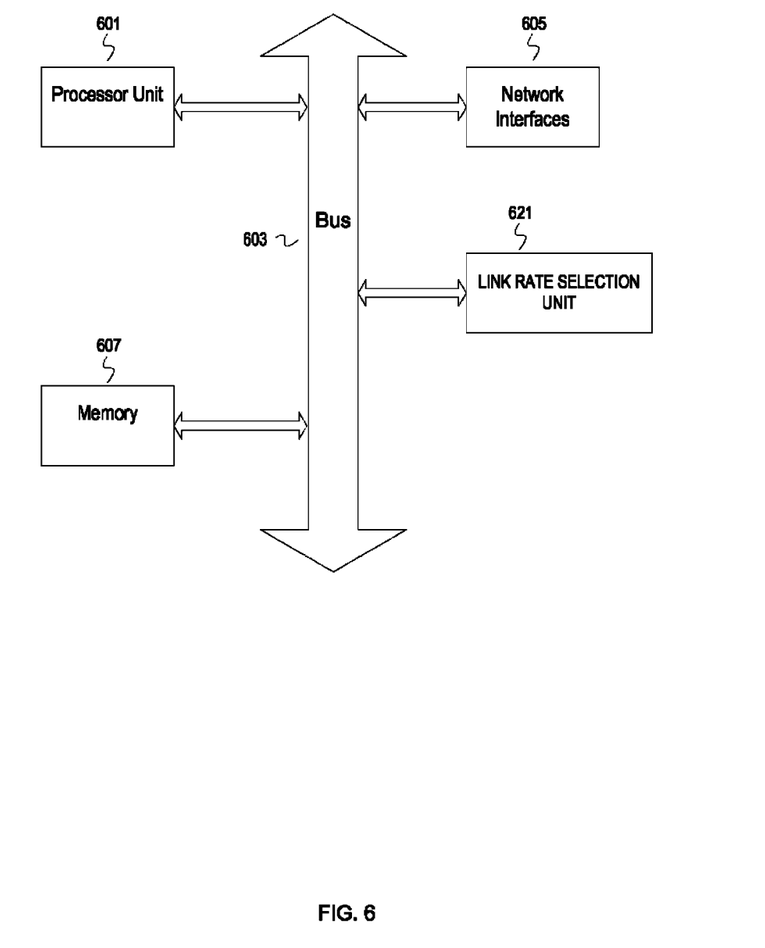
FIG. 6 depicts an example wireless access device.

FIG. 6 depicts an example wireless access device. A wireless access device includes a processor unit 601 (possibly including multiple processors, multiple cores, multiple nodes, and/or implementing multi-threading, etc.). The wireless access device includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The wireless access device also includes a bus 603 (e.g., PCI, ISA, PCI-Express, HyperTransport®, InfiniBand®, NuBus, etc.), and network interfaces 605 that include at least one wireless network interface (e.g., an ATM interface, an Ethernet interface, a Frame Relay interface, SONET interface, wireless interface, etc.). The wireless access device also includes a link rate selection unit 621 that selects and instantiate different link rate determination operations based on traffic class. Any one of the above described functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., additional network interfaces, peripheral devices, etc.). The processor unit 601 and the network interfaces 605 are coupled to the bus 603. Although illustrated as being coupled to the bus 603, the memory 607 may be coupled to the processor unit 601.

While the embodiments are described with reference to various implementations and exploitations, it will be understood that these embodiments are illustrative and that the scope of the inventive subject matter is not limited to them. In general, techniques as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining that a wireless channel will carry a first class of traffic and a second class of traffic, wherein presentation of content conveyed by the first class of traffic has a lesser degree of presentation time sensitivity than presentation of content conveyed by the second class of traffic; and
   instantiating different wireless link rate determination operations for the first class of traffic and the second class of traffic that determine wireless link rates for wireless transmission of data units of the first and second classes of traffic, wherein the different wireless link rate determination operations correspond to the different degrees of presentation time sensitivity,
   wherein the wireless link rate determination operations for the first class of traffic aggressively probe for a maximum wireless link rate and the wireless link rate determination operations for the second class of traffic conservatively probe for a smooth wireless link rate that accommodates a greater degree of presentation time sensitivity of data units of the second class of traffic relative to the presentation time sensitivity of the data units of the first class of traffic,
   wherein the wireless link rate determination operations for the second class of traffic operate within an upper threshold and a lower threshold.

2. The method of claim 1 further comprising selecting a first code that implements the wireless link rate determination operations instantiated for the first class of traffic and a second code that implement the wireless link rate determination operations instantiated for the second class of traffic.

3. The method of claim 1, wherein the upper threshold corresponds to at least one of a maximum number of retries, maximum transmission time, and a maximum number of dropped units, and the lower threshold corresponds to at least one of a minimum raw throughput and minimum actual throughput.

4. The method of claim 1 further comprising:
   enqueueing data units of the first class of traffic in a first queue and data units of the second class of traffic in a second queue; and
   associating the instantiated wireless link rate determination operations for the first class of traffic with the first queue and the instantiated wireless link rate determination operations for the second class of traffic with the second queue.

5. The method of claim 1, wherein said determining that the wireless channel will carry the first and second classes of traffic comprises one or more of inspecting data units to determine traffic class, inferring traffic class from connection information, and examining messages that indicate traffic class.

6. The method of claim 1 further comprising:
   determining that a number of data units in a queue for the first class of traffic exceeds a queue length threshold; and
   decreasing transmission opportunities for data units of the second class of traffic while increasing transmission opportunities for the data units in the queue for the first class of traffic.

7. The method of claim 6, wherein said decreasing transmission opportunities comprises dropping data units of the second class of traffic.

8. The method of claim 6, wherein decreasing transmission opportunities comprises adjusting at least one of contention window, number of retries, a bounded time interval for a device to transmit as many data units as possible, and backoff time.

9. The method of claim 6, wherein said increasing transmission opportunities for the data units in the queue for the first class of traffic comprises modifying priority indications of the queue for the first class of traffic and a queue for the second class of traffic.

10. The method of claim 1, wherein the first class of traffic and the second class of traffic correspond to video traffic of different priorities.

11. The method of claim 1 further comprising:
  determining a first wireless link rate for the first class of traffic with the wireless link rate determination operations instantiated for the first class of traffic; and
  determining a second wireless link rate for the second class of traffic with the wireless link rate determination operations instantiated for the second class of traffic.

12. One or more non-transitory machine-readable storage media having stored therein instructions, which when executed by a set of one or more processor units causes the set of one or more processor units to perform operations that comprise:
  determining that a wireless channel will carry a first class of traffic and a second class of traffic, wherein data units of the first class of traffic have a lesser degree of presentation time sensitivity than data units of the second class of traffic; and
  instantiating different wireless link rate determination operations, for the first class of traffic and the second class of traffic, that determine wireless link rates for wireless transmission of the data units of the first and second classes of traffic, wherein the different wireless link rate determination operations correspond to the different degrees of presentation time sensitivity,
  wherein the wireless link rate determination operations for the first class of traffic aggressively probe for a maximum wireless link rate and the wireless link rate determination operations for the second class of traffic conservatively probes for a smooth wireless link rate that accommodates a greater degree of presentation time sensitivity of data units of the second class of traffic relative to the presentation time sensitivity of the data units of the first class of traffic,
  wherein the wireless link rate determination operations for the second class of traffic operate within an upper threshold and a lower threshold.

13. The non-transitory machine-readable storage media of claim 12, wherein the operations further comprise selecting a first code that implements the wireless link rate determination operations instantiated for the first class of traffic and a second code that implements the wireless link rate determination operations instantiated for the second class of traffic.

14. The non-transitory machine-readable storage media of claim 12, wherein the operations further comprise:
  determining the maximum wireless link rate for the first class of traffic with the wireless link rate determination operations instantiated for the first class of traffic; and
  determining the smooth wireless link rate for the second class of traffic with the wireless link rate determination operations instantiated for the second class of traffic.

15. An apparatus comprising:
  a wireless network interface operable to receive and to transmit data units;
  a first queue for data units of a first traffic class;
  a second queue for data units of a second traffic class; and
  a link rate selection unit operable to determine different wireless link rates for data units of the first traffic class and data units of the second traffic class based, at least in part, on different degrees of presentation time sensitivity of the data units of the first traffic class and of the data units of the second traffic class, wherein the data units of the second class of traffic have a greater degree of presentation time sensitivity than the data units of the first class of traffic,
  wherein the link rate selection unit being operable to determine the different wireless link rates for the data units of the first traffic class and the data units of the second traffic class based, at least in part, on the different degrees of presentation time sensitivity comprises the link rate selection unit being operable to aggressively probe for a maximum wireless link rate for the data units of the first traffic class and to conservatively probe for a smooth wireless link rate that accommodates the greater degree of presentation time sensitivity of data units of the second traffic class,
  wherein the link rate determination operations for the second class of traffic operate within an upper threshold and a lower threshold.

16. The apparatus of claim 15 further comprising a queue management unit operable to determine that a first data unit is of the first traffic class and to enqueue the first data unit into the first queue, and operable to determine that a second data unit is of the second traffic class and to enqueue the second data unit into the second queue.

17. The apparatus of claim 16, wherein the queue management unit is further operable to determine that a number of data units in the first queue exceeds a queue length threshold and operable to decreasing transmission opportunities for data units in the second queue while increasing transmission opportunities for the data units in the queue based, at least in part, on the degree of presentation time sensitivity of the first traffic class being greater than the degree of presentation time sensitivity of the second traffic class.

18. The apparatus of claim 15, wherein the link rate selection unit is further operable to select and invoke different wireless link rate determination functions for the first queue and the second queue, wherein the different invoked wireless link rate determination functions determine the wireless link rates.

* * * * *